United States Patent
Becker et al.

(10) Patent No.: US 8,616,829 B2
(45) Date of Patent: Dec. 31, 2013

(54) SHROUDED TURBINE ASSEMBLY

(75) Inventors: Frederick E. Becker, Reading, MA (US); Kerry N. Oliphant, Sandy, UT (US); Andrew R. Provo, Sharon, VT (US)

(73) Assignee: Concepts ETI, Inc., White River Junction, VT (US)

( * ) Notice: Subject to any disclaimer, the term of this patent is extended or adjusted under 35 U.S.C. 154(b) by 625 days.

(21) Appl. No.: 12/618,341

(22) Filed: Nov. 13, 2009

(65) Prior Publication Data

US 2010/0119362 A1 May 13, 2010

Related U.S. Application Data

(60) Provisional application No. 61/114,148, filed on Nov. 13, 2008, provisional application No. 61/114,163, filed on Nov. 13, 2008.

(51) Int. Cl.
  *F03B 13/12* (2006.01)
(52) U.S. Cl.
  USPC .......... 415/3.1; 415/4.3; 415/213.1; 415/220; 415/199.4; 415/906; 416/189; 416/243; 290/43; 290/54
(58) Field of Classification Search
  USPC .............. 415/3.1, 4.3, 4.4, 213.1, 218.1, 220, 415/193, 906, 908, 199.4; 416/189, 243; 290/43, 54
  See application file for complete search history.

(56) References Cited

U.S. PATENT DOCUMENTS

| | | | | |
|---|---|---|---|---|
| 3,531,214 A * | 9/1970 | Abramson | ...................... | 415/68 |
| 4,095,918 A * | 6/1978 | Mouton et al. | ..................... | 415/7 |
| 4,150,301 A * | 4/1979 | Bergey, Jr. | ...................... | 290/44 |
| 4,163,904 A * | 8/1979 | Skendrovic | ..................... | 290/54 |
| 4,789,302 A * | 12/1988 | Gruzling | ....................... | 415/221 |
| 5,040,945 A * | 8/1991 | Levesque | .................... | 415/124.1 |
| 5,315,159 A * | 5/1994 | Gribnau | ......................... | 290/55 |
| 7,214,029 B2 * | 5/2007 | Richter | .......................... | 415/4.5 |
| 8,072,089 B2 * | 12/2011 | Krouse et al. | ................... | 290/54 |
| 2009/0311099 A1 * | 12/2009 | Richards | ...................... | 416/120 |

* cited by examiner

*Primary Examiner* — Igor Kershteyn
(74) *Attorney, Agent, or Firm* — Downs Rachlin Martin PLLC

(57) ABSTRACT

A turbine that allows for the conversion of the kinetic energy of waterway to mechanical power for use in an energy accepting apparatus is described. The turbine has complimentary components that improve the power efficiency of the turbine. The turbine may include a blade shroud and a plurality of blades that are connected to the blade shroud. On the external surface of the blade shroud, a drive mechanism and/or a brake mechanism may be disposed. An inlet nozzle and outlet diffuser may be used in combination with the turbine. The turbine may be useful in a number of settings, including, but not limited to, streams, rivers, dams, ocean currents, or tidal areas that have continuous or semi-continuous water flow rates and windy environments.

32 Claims, 6 Drawing Sheets

SHROUDED TURBINE ASSEMBLY

RELATED APPLICATION DATA

This application claims the benefit of priority of U.S. Provisional Patent Application No. 61/114,148 filed Nov. 13, 2008, and titled Annular Drive Apparatus for Turbines and U.S. Provisional Patent Application No. 61/114,163 filed Nov. 13, 2008, and titled Annular Control Apparatus for Turbines, both of which are incorporated by reference herein in their entireties.

FIELD OF THE INVENTION

The present invention generally relates to the field of turbines that produce usable energy from the flow of water or air. In particular, the present invention is directed to a shrouded turbine assembly.

BACKGROUND

Hydropower is a renewable resource that is derived from the force or energy of moving water. For centuries hydropower has been used to accomplish tasks such as milling, pumping, sawing timber, and manufacturing. More recently, hydropower's usefulness as a source for electric power generation has been more fully exploited and today comprises a significant portion of the world's electricity needs.

Hydroelectric power generation has been accomplished through the use of gravitational force of falling water. Hydroelectric power has been used worldwide to generate huge amounts of electricity from water stored behind massive dams. However, the efficacy of large hydroelectric power projects has been called into question because of the human, economic and environmental impacts of dam construction and maintenance.

Hydroelectric projects can be disruptive to the natural topography of the installation area, the surrounding aquatic ecosystems both upstream and downstream of the plant site, and to human habitation. These disruptions include inconsistent or nonexistent sediment suspension that damages river beds and banks, physical damage to fish and wildlife habitat, especially spawning and hatching grounds, and changes in water temperature that affect wildlife and fauna. Another deleterious effect of hydroelectric power stations is that they typically require reservoir creation, which submerges habitable land. Relocation during reservoir creation is not only necessary for wildlife, but also for humans living within planned reservoir boundaries. Man-made reservoirs of hydroelectric power plants in certain regions may also produce substantial amounts of methane and carbon dioxide because of decaying plant material resulting from the underwater anaerobic environment. Lastly, the possibility of a dam failure, either through construction flaws or via assault during wartime, sabotage, and/or terrorism, while remote, are a constant threat to humans, wildlife, and fauna alike.

Harnessing a waterway's kinetic energy to avoid the problems of large hydroelectric plants has been challenging. Placing hydroelectric turbines in a waterway will not result in significant power creation because the turbines are generally designed for directed flows and high head conditions, e.g., a dam or waterfall. Given some apparent similarities between the flow of wind and the flow of water, many others have tried to use modified wind turbine designs, e.g., waterproof, different blade designs, etc., to capture waterway energy. However, these implementations have failed to survive standard waterway conditions, suffering from sheared blades during standard river conditions and an inability to handle the torque produced by the flowing water. Obvious improvements like stronger materials for turbine blades have not proved sufficient to allow for sustainable operation.

SUMMARY

In an exemplary embodiment there is presented a flowing water turbine, comprising: a blade shroud having an interior surface and an exterior surface; a shaft coaxial with the blade shroud; and a plurality of blades coupled to the shaft, the plurality of blades extending radially from the shaft so as to engage the interior surface, wherein the plurality of blades are configured and dimensioned in combination with the shroud to provide a lift coefficient greater than about 1.5.

In another exemplary embodiment there is presented a flowing water turbine assembly configured to power a rotational energy conversion apparatus located above a water surface, comprising: a support structure configured to extend from above the water surface to below the water surface; a turbine rotatably mounted on the structure for positioning entirely below the water surface, the turbine comprising: an annular blade shroud having an interior surface and an exterior surface; a shaft coaxial with the blade shroud; and a plurality of blades coupled to the shaft, the plurality of blades extending radially from the center shaft so as to engage the blade shroud at the interior surface, wherein the plurality of blades are configured and dimensioned in combination with the annular blade shroud to provide a lift coefficient greater than about 1.5; and a drive assembly component disposed on the exterior surface of the blade shroud and operatively engageable with the rotational energy conversion apparatus.

In yet another exemplary embodiment there is presented a flowing water turbine assembly, comprising: a support structure; first and second bearings carried by the support structure; a shaft having a front and rear ends rotatably received in the first and second bearings, respectively; an annular blade shroud coaxially disposed around the shaft in a sealing relationship with the support structure, the shroud being rotatable with respect to the support structure and having an interior surface and an exterior surface; and a plurality of blades coupled to the shaft, the plurality of blades extending radially from the center shaft so as to engage the annular blade shroud, wherein the plurality of blades are configured and dimensioned in combination with the annular blade shroud to provide a lift coefficient of greater than about 1.5.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention are directed to a flowing fluid turbine that may be useful in a number of settings, including, but not limited to, streams, rivers, spill ways, ocean currents, or tidal areas that have continuous or semi-continuous water flow rates. Generally, a turbine assembly 10 made in accordance with certain embodiments of the present invention includes a turbine having a plurality of blades for the conversion of energy from a flowing fluid, e.g., water, into rotational energy that may be used to power any number of apparatuses, including, but not limited to, pumps and fans, or for use in energy conversion apparatuses such as generators.

Figure 1:
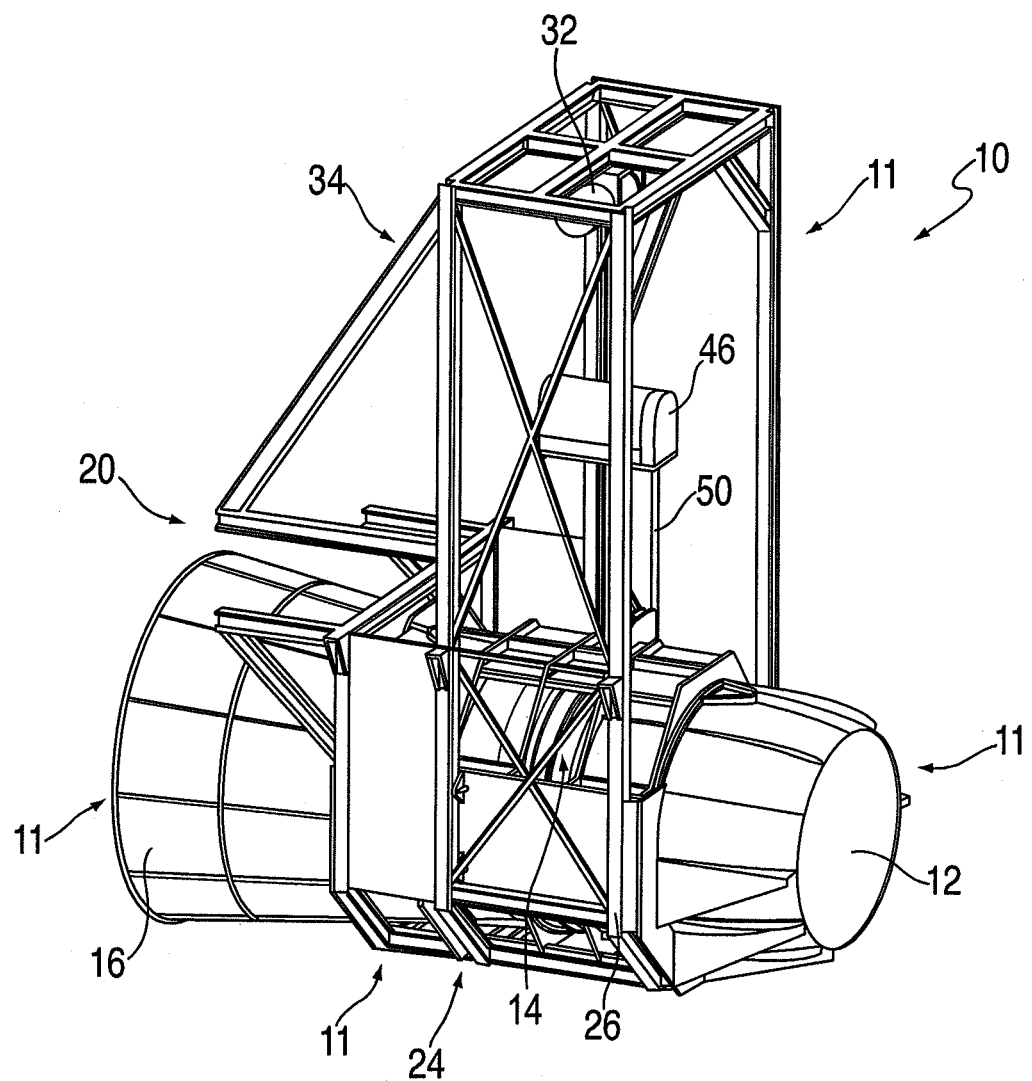
FIG. 1 is an isometric view of an example of a flowing water turbine with nozzle, and diffuser and a support structure with associated components in accordance with an embodiment of the present invention.
Figure 3:
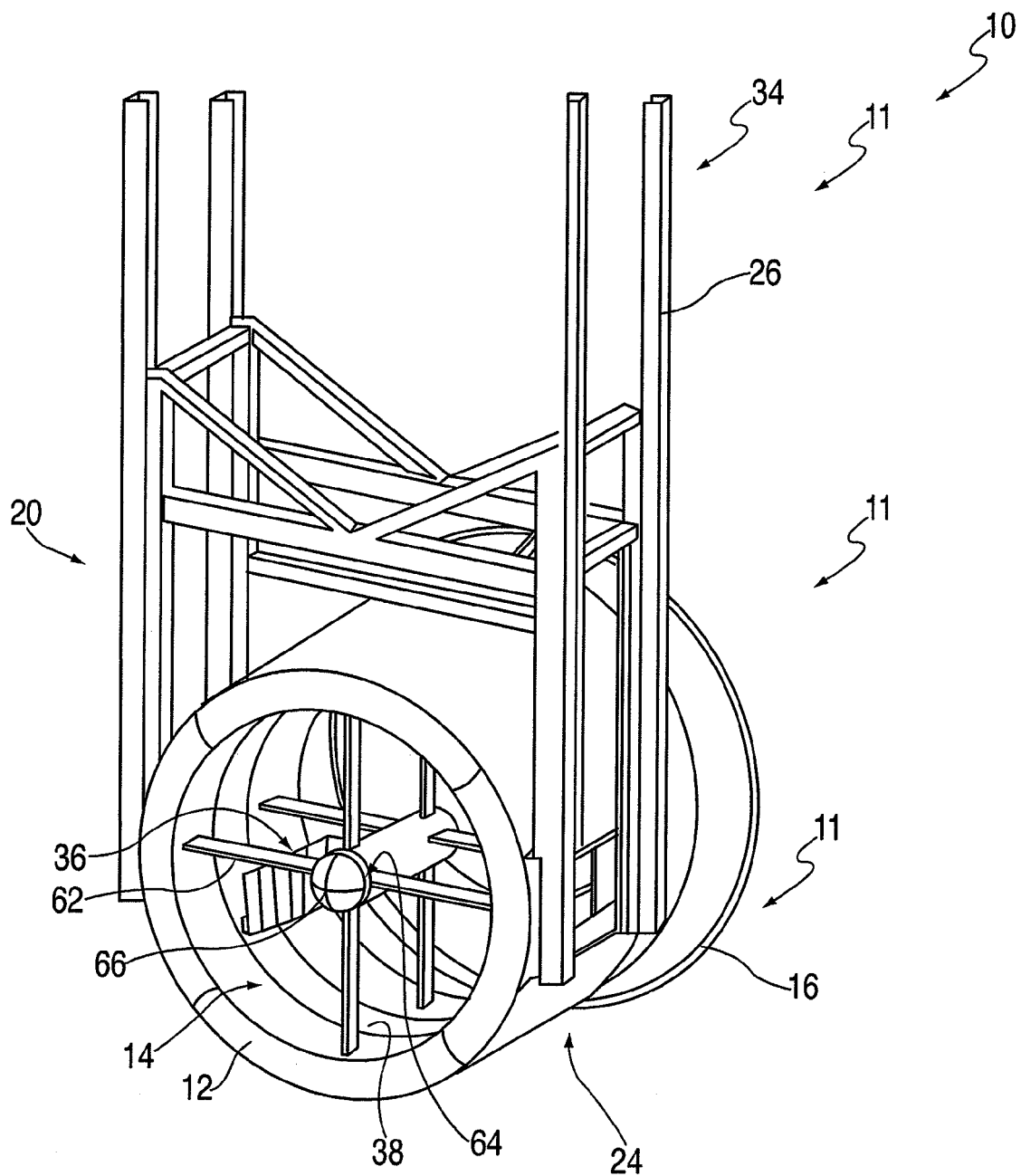
FIG. 3 is an isometric view of a flowing water turbine assembly, and a support structure with associated components made in accordance with another alternative embodiment of the proposed invention.

Referring now to FIGS. 1 and 3, at a high level turbine assembly 10 includes a plurality of structures 11 and a turbine 14 having a plurality of blades 18. Structures 11 may include components that are located above or below the surface of the water, such as a nozzle 12, a diffuser 16, and a support structure 20. Generally, nozzle 12 and diffuser 16 (discussed in detail further below) are mounted with the turbine and are sized and configured to direct flow so as to improve the kinetic energy conversion of turbine assembly 10. Support structure 20 may include several above and below water components capable of supporting and maneuvering turbine assembly 10 while in the water.

Support structure 20 may include a turbine support 24 and a support frame 34. Turbine support 24 may carry the underwater assembly of turbine assembly 10 or only certain components of turbine assembly 10, such as turbine 14, an outlet housing 28 (FIG. 4), nozzle 12 and/or diffuser 16. In an exemplary embodiment, turbine support 24 includes a plurality of guide members 26 that extend from the support frame 34 to below the water's surface. Guide members 26 provide a means for manipulating the depth of turbine 14 in the waterway and for the extraction of turbine 14 or other components of turbine assembly 10 from the waterway.

Figure 2:
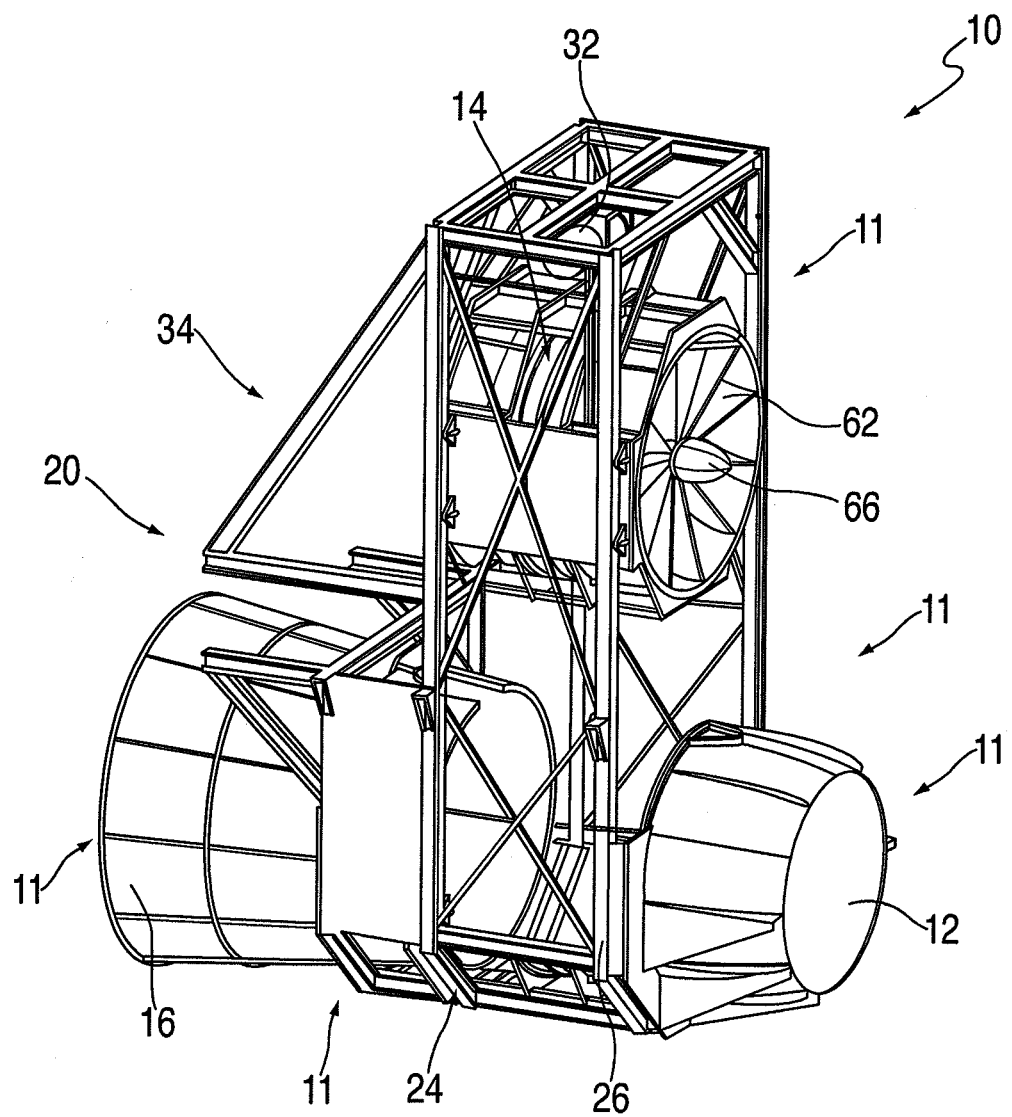
FIG. 2 is an isometric view of an example of a flowing water turbine with nozzle and diffuser and an support structure with associated components when a turbine has been extracted from the water in accordance with an embodiment of the present invention.

As shown in FIGS. 1 to 3, support frame 34 is generally a partially above water structure that may include extraction means 32 to remove all (FIG. 3) or a portion of turbine assembly 10 (FIGS. 1 and 2) from a waterway and/or an energy accepting apparatus 46. Extraction means 32 may include a lifting device, such as an electric winch or other device that is suitable for lifting all or a portion of turbine assembly 14 out of the water.

Support structure 20 may be constructed of any suitable materials known in the art for creating such structures. In an exemplary embodiment, support structure 20 is made of low-carbon steel. Use of support structure 20 allows for, among other things, the proper positioning of turbine 14 in a waterway, maintenance or replacement of turbine 14, and/or for maintaining and/or manipulating the vertical distance between turbine assembly 10 and the support structure. Support structure 20 may be supported off-shore or may be supported by an on-shore structure sized and configured to support the remainder of turbine assembly 10.

Figure 4:
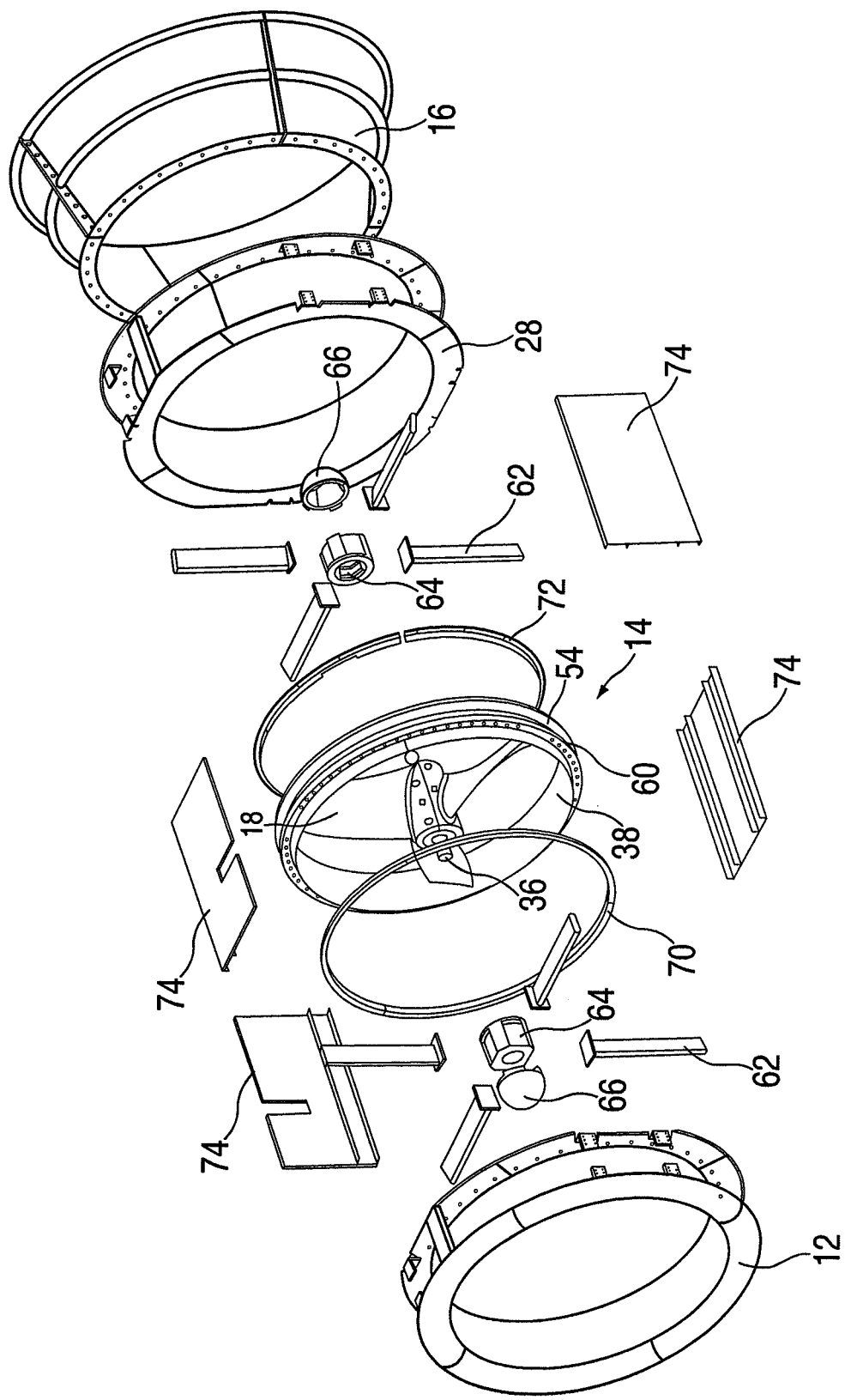
FIG. 4 is an isometric exploded view of a flowing water turbine assembly according to an embodiment of the present invention.
Figure 5:
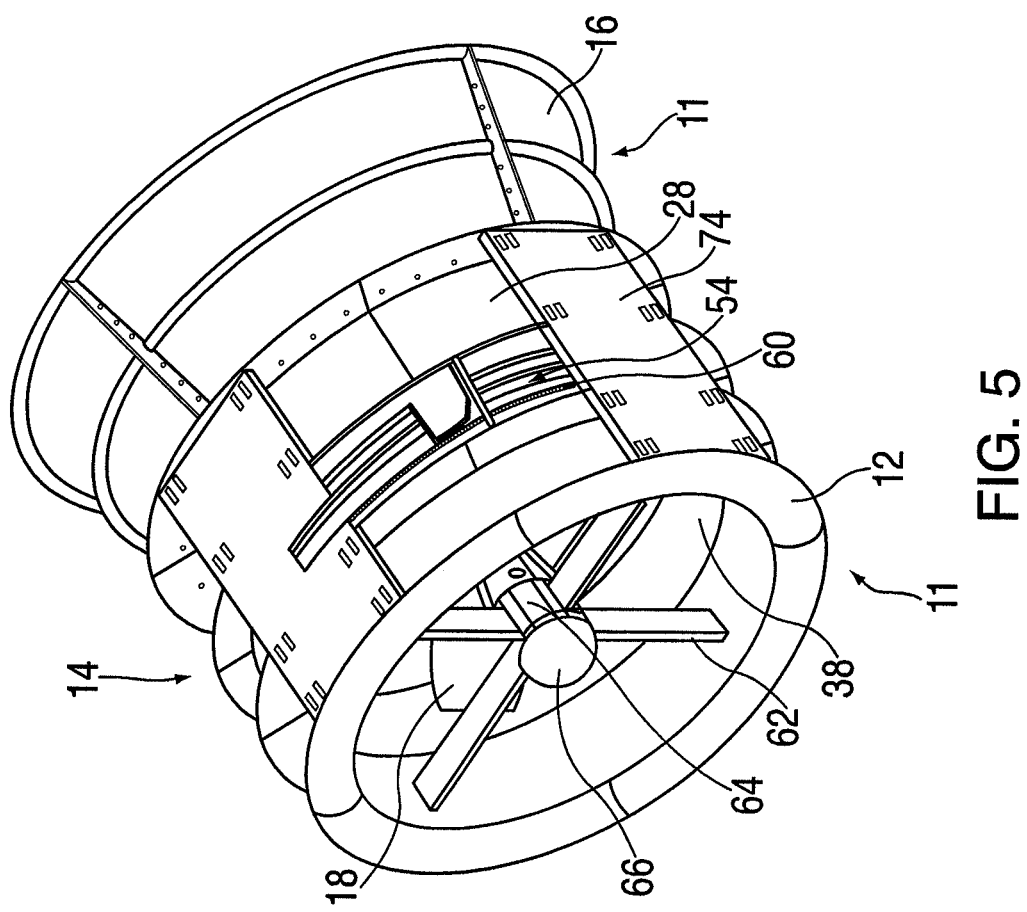
FIG. 5 is an isometric view of a flowing water turbine assembly according to an embodiment of the present invention.

FIGS. 4 and 5 show an exemplary turbine assembly 10 built in accordance with the present disclosure, partially unassembled and assembled, respectively. Turbine assembly 10 may include a nozzle 12 that accepts flow from a waterway. Nozzle 12 may be of many different configurations, for example, to minimize boundary layer disturbance. The size and configuration of nozzle 12 is generally dependent upon the design of diffuser 16 and turbine 14. For instance, in an exemplary embodiment nozzle 12 may be generally cylindrical with a rounded front edge. The aforementioned embodiment may be used, for instance, when high mass fluid flow is induced by diffuser 16, which makes the upstream capture area of turbine assembly 10 very nearly the same as the sweep area of turbine 14. In another exemplary embodiment, nozzle 12 may flare outwards in concentric circles or ellipses, for example, ellipses with a 3 to 1 ratio, that may reduce power conversion losses by provide very small boundary layers at nozzle 12. In another exemplary embodiment, and as shown in FIG. 1, nozzle 12 may be shaped like a cowling.

Nozzle 12 typically includes support for center shaft 36 via struts 62 and bearing block 64. Struts 62 generally extend from bearing block 64 to the interior surface of nozzle 12. Attached upstream of bearing block 64 may be a cone deflector 66 or other suitable attachment for guiding the flow of water around bearing block 64. Bearing block 64 typically includes a bearing assembly (not shown) that supports and allows for rotation of shaft 36. Generally, bearing block 64 allows shaft 36 to flex with the movement of shaft 36. In an exemplary embodiment, bearing block 64 includes a mechanical articulating joint such as a rod end bearing.

Generally, struts 62 provide structural stability for turbine assembly 10 and support bearing block 64. In an exemplary embodiment, each of struts 62 are a flat plate of sheet metal with rounded leading and trailing edges to minimize drag. In certain embodiments, struts 62 may be sized and configured to reduce drag by, for instance, angling the struts with respect to the axial direction. In an exemplary embodiment, strut 62 is angled at 15 degrees from the axial direction when the flow coming off of the turbine 14 may have an angle ranging from about 30 degrees at shaft 36 to near 0 degrees at shroud 38. In this example, the placement of strut 62 at an angle of about 15 degrees keeps the flow angle of attack on the strut to within 15 degrees of the angle range of turbine 14. Strut 62 may be constructed of materials including, but not limited to, steels, aluminums, and titaniums, that will provide the strength and corrosion resistance suitable for an underwater environment. In addition, although only four struts are shown in FIGS. 4 and 5, more or fewer struts may be use in turbine assembly 10.

Nozzle 12 may mated with turbine 14 via inlet ring 70. As used herein, mated means complementarily shaped and disposed in close proximity, but not necessarily touching, so as to minimize flow leakage between the parts. Inlet ring 70 is typically cylindrical with a diameter that is slightly larger than the outside diameter of turbine 14. Inlet ring 70 may be disposed on the periphery of nozzle 12 and acts to seal the interface between nozzle 12 and turbine 14 while allowing for the rotation of turbine 14 relative to the inlet ring and nozzle 12. In an exemplary embodiment, inlet ring 70 is sized and configured to rotatably mate with turbine 14 without the use of bearings or other materials between the inside edge of inlet ring 70 and the outside edge of turbine 14.

Turbine 14 is generally cylindrical and includes blades 18 and an annular shroud 38 that is coaxial with shaft 36. Blades 18 extend from shaft 36 to shroud 38. Typically, blades 18 are configured so as to have a portion of blades 18 form oblique angles with the flow of water traveling from the upstream side to the downstream side of blades 18 (into the page as shown in FIG. 4). In this configuration, the water's movement from upstream side 40 to downstream side 42 places pressure on blades 18 causing the turbine 14 to rotate. Use of shroud 38 may be advantageous because it locally directs water flow and strengthens the turbine to permit blade design with higher loading, such as higher lift coefficients. Blades 18 may be constructed of materials including, but not limited to, plastics, metals, and rubbers. In one exemplary embodiment, blades 18 are made of aluminum. It is understood that although three blades 18 are shown, other number of blades 18 that fulfill the advantages listed herein may be designed for use in turbine 14 (as described further below).

The shape and size of blades 18 may change along the length of blades 18 and the position used for optimal angle of attack may be adjusted in response to flow conditions and alterations of the tip speed ratio. In an exemplary embodiment of turbine assembly 10, blades 18 maintained the same shape throughout its length and were scaled for optimal length and rotated for optimal angle of attack according to the local flow conditions and the tip speed ratio. In another exemplary embodiment, the point angle of attack for blades 18 was set at 6 degrees, the maximum lift to drag ratio.

Turbine 14 may also be mated with an outlet housing 28 via outlet ring 72. Outlet ring 72 is similar to inlet ring 70 in size and configuration and serves the same purposes of providing a seal between outlet housing 28 and turbine 14 while also allowing for turbine 14 to rotate with respect to outlet ring 72 and outlet housing 28.

Outlet housing 28 is generally cylindrical with an axis coaxial with the axis of turbine 14 and nozzle 12. Outlet housing 28 typically includes support for center shaft 36 via struts 62 and bearing block 64. In an exemplary embodiment, outlet housing 28, when combined with nozzle 12, supports and allows for the rotation of shaft 36 on both sides of turbine 14 and limits axial movement of turbine 14. Struts 62 generally extend from bearing block 64 to the interior surface of outlet housing 28. Attached downstream of bearing block 64 may be a cone deflector 66 or other suitable attachment for guiding the flow of water around bearing block 64. Bearing block 64 typically includes a bearing assembly (not shown) that supports and allows for rotation of shaft 36. Generally, bearing block 64 allows shaft 36 to flex with the movement of shaft 36. In an exemplary embodiment, bearing block 64 includes a mechanical articulating joint such as a rod end bearing.

Turbine assembly 10 may also include diffuser 16 to condition the water exiting turbine 14 for reentry into the waterway. Generally, diffuser 16 is sized and configured to minimize the static pressure after turbine 14 so that turbine assembly 10 experiences increased flow. In an exemplary embodiment, diffuser 16 has a diameter that enlarges gradually along its longitudinal axis up to a maximum of about 4/3 times the diameter of the diffuser closet to turbine 14. In another exemplary embodiment, diffuser 16 has a half angle of greater than about 15 degrees, which is aggressive when compared to standard straight wall conical diffuser design practices. However, the design of turbine assembly 10, e.g., nozzle 12 and turbine 14, allows for this half angle to be used effectively. In yet another exemplary embodiment, diffuser 16 has a half angle of greater than about 20 degrees. It is also understood that in certain embodiments, diffuser 16 and outlet housing 28 may be a unitary structure.

Turbine assembly 10 may also include connectors 74 for attaching nozzle 12 to outlet housing 28. Connectors 74 are disposed on the outer periphery of nozzle 12 and outlet housing 28 and generally do not make contact with turbine 14. Connectors 74 may also be sized and dimensioned so as to provide access to and/or support for drive mechanism 60 or braking mechanism 54.

The design of the present invention provides for fluid dynamic characteristics that are uniquely suited to the flowing water environment. For example, the tip speed ratio, i.e., the ratio of tip speed of the blades to the speed of the flowing fluid, in exemplary embodiments of turbine assembly 10, is between about 1.2 and about 6. In another exemplary embodiment, turbine assembly 10 has a tip speed ratio of about 1.2 to about 4. In yet another exemplary embodiment, turbine assembly 10 has a tip speed ratio of about 1.5 to 3. In yet another exemplary embodiment, turbine assembly 10 has a tip speed ratio of about 1.9. In another example, embodiments of the present invention may have relatively high lift coefficient to allow for greater power extraction at a given nominal flow rate. In an exemplary embodiment, turbine assembly 10 has blades with a lift coefficient of greater than about 1.5. In another exemplary embodiment, turbine assembly 10 has blades with a lift coefficient of about 2. Another characteristic is lift to drag ratio. Typically, the higher the lift to drag ratio, the more power may be produced by turbine assembly 10. For an exemplary embodiment of turbine assembly 10, the lift to drag ratio at the nominal flow point is about 180 to 200.

Another defining characteristic of the present invention is the solidity of the turbine. Solidity is the measurement of the blade area to the blade sweep area, and is generally determined by multiply the number of blades by the blade chord length at a given radius and dividing by the circumferential length at that radius. In exemplary embodiments of turbine assembly 10, the solidity is between about 0.08 and 0.20. In another exemplary embodiment, the solidity of turbine assembly 10 is between about 0.10 and 0.15. In yet another exemplary embodiment, the solidity of turbine assembly 10 is about 0.12. In yet another exemplary embodiment of turbine assembly 10, a factor of 1.333 is applied to standard chord and solidity calculations as a result of the design flexibility afforded by turbine assembly 10.

Turbine 14 cooperates with drive mechanism 60, to transfer rotational energy to an energy accepting/conversion apparatus such as, for example, a pump or fan, or a generator 46 (FIG. 1). In one exemplary embodiment, as shown in FIGS. 4 to 7, drive mechanism 60 includes a sprocket 48 (best seen in FIG. 7) extending around the complete circumference of shroud 38. In this example, attached to shroud 38 via sprocket 48 is a chain 50 (FIGS. 1 and 6) that transfers the rotational energy generated by shroud 38 to an energy accepting apparatus 46 (FIG. 1). It is understood that the circumference of shroud 38 could be designed to accommodate other energy transfer means, including, but not limited to, a pulley for a belt drive, bull gear for a gear drive, or a simple wheel for a friction drive.

Among the many advantages of this drive configuration, i.e., placement of drive mechanism 60 on shroud 38 to convey rotational energy of the turbine 14 to an energy accepting apparatus 46, is that turbine 14 provides low speed, high torque energy in response to the water flows. As a result, speed ratios of, for example, about 20:1 to about 40:1 may be achieved through a mechanical transfer of the rotational energy turbine 14. In addition, chain 50 may be long enough to extend out of the water to connect to a energy accepting apparatus 46 that is positioned, for instance, on support structure 20, thus eliminating the need for submersible unit or housing for energy accepting apparatus 46.

Figure 7:
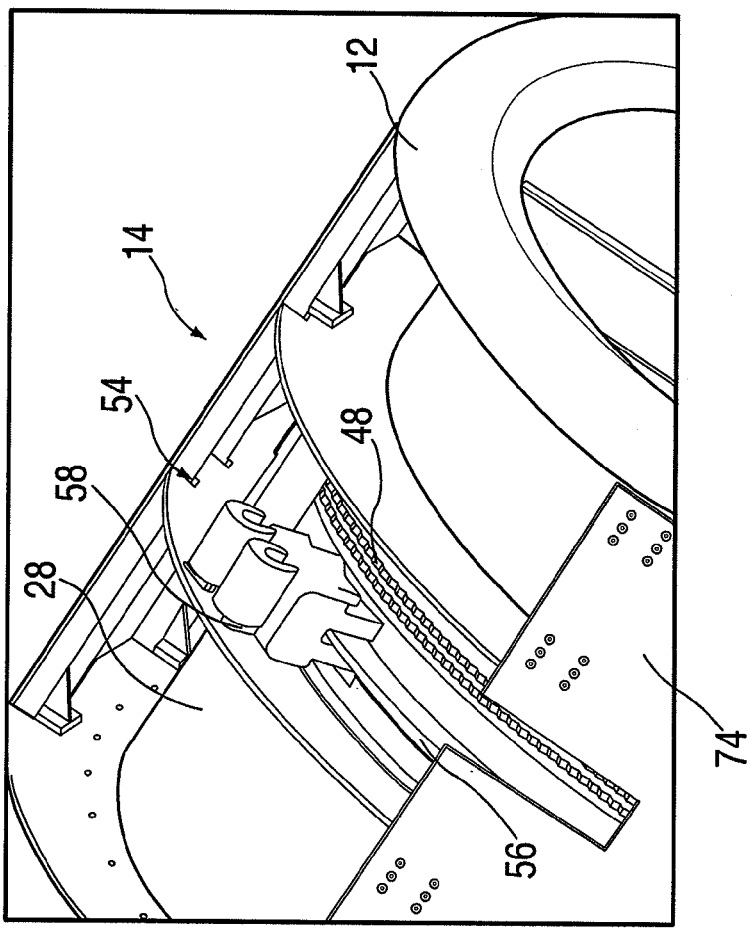
FIG. 7 is an isometric view of a flowing water turbine assembly with a focus on a braking mechanism in an embodiment of the present invention.
Figure 6:
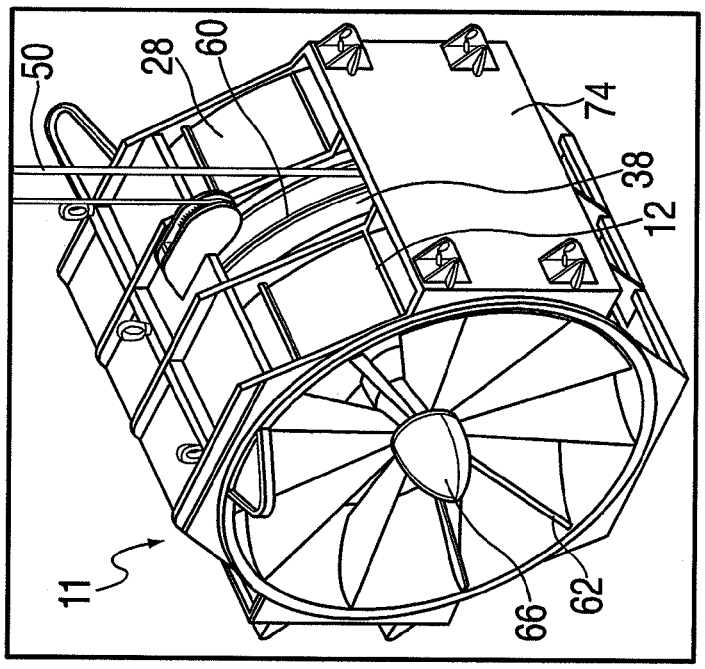
FIG. 6 is an isometric view of another flowing water turbine assembly according to an embodiment of the present invention.

As with most other machinery with a rotating axis, there may be certain operating conditions where the machinery should be slowed or stopped, e.g., for maintenance or during high flow conditions. In order to slow turbine 14, in an exemplary embodiment the turbine is equipped with braking mechanism 54. As shown in FIG. 7, braking mechanism 54, in an exemplary embodiment comprises a flange 56 that extends around the circumference of turbine 14. Flange 56 may be substantially perpendicular to the outer surface of shroud 38 and extend up a suitable distance to be engaged by a braking apparatus 58. In one example, braking apparatus 58 is a disc brake, but other mechanical braking systems such as cone brakes, drum brakes, or band brakes or hydraulic or air braking systems may be adapted for similar use. For example, in another exemplary embodiment turbine 14 may have a band (not shown) encircling the outside of shroud 38, with the band being sized and configured so that the band may be tightened around shroud 38 and thus slow turbine 14 when braking is necessary.

Among the many advantages of using braking mechanism 54 is that the energy necessary to brake a turbine at center shaft 36 is significantly higher than at shroud 38, thus integration of brake mechanism 54 into the shroud of turbine 14 generally results in one or more of the following advantages such as more reliable braking, less wear on braking mechanisms, and simpler braking mechanisms, among others. As braking requirements are highly dependent on flow conditions and turbine design, braking mechanism 54 may be sized and configured to slow down and/or stop the turbine 14 when the turbine is in a "runaway" case, i.e., where the blades are spinning at the free wheel speed for the highest available flow. In an exemplary embodiment, braking mechanism 54 is designed to stop a turbine 14 that is 12 ft. in diameter in a "runaway" condition or at least 4400 ft. lbs. In another exemplary embodiment, braking mechanism 54 operates on a disk with a seventy-eight inch equivalent radius and has a force equal to 32000 lbs. In addition, braking mechanism 54 has a coefficient of friction with a range of about 0.2 to about 0.25 in a wet condition.

Turbine 14 may be capable of extracting more energy from the kinetic flow of water than could otherwise occur with, for example, the use of an unshrouded turbine. Turbine 14 allows for the design of blades 18 with the appropriate profile and chord length to maximize lift and minimize drag while maintaining the strength necessary to withstand the force of the waterway and the uncertainties associated with an underwater environment. In addition, turbine 14 including drive mechanism 60 and braking mechanism 54 reduces the stress placed on shaft 36 because the drive mechanism and braking mechanism are both at the periphery, i.e., shroud 38, rather than at the shaft. Reducing the stress at shaft 36 lessens the shaft strength necessary to operate turbine 10 in harsh conditions and thus makes turbine assembly 10 more versatile and reliable.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A flowing water turbine, comprising:
    a blade shroud having an interior surface and an exterior surface;
    a shaft coaxial with said blade shroud; and
    a plurality of blades coupled to said shaft, said plurality of blades extending radially from said shaft so as to engage said interior surface, wherein said plurality of blades are configured and dimensioned in combination with said shroud to provide a lift coefficient greater than about 1.5 when said blade shroud and said plurality of blades are disposed in flowing water.

2. The turbine of claim 1, wherein said plurality of blades are configured and dimensioned in combination with said shroud to provide a lift coefficient of about 2.

3. The turbine of claim 1, wherein said plurality of blades have a radial length, a chord length, and angle of attack such that said plurality of blades create a solidity of greater than about 6% and less than about 20%.

4. The turbine of claim 3, wherein said plurality of blades have a radial length, a chord length, and angle of attack such that said plurality of blades create a solidity of greater than about 10 percent and less than about 15 percent.

5. The turbine of claim 4, wherein said solidity is greater than about 11 percent and less than about 13 percent.

6. The turbine of claim 1, further comprising a drive assembly component disposed on said exterior surface, said component configured to be cooperatively engaged with a power take off mechanism to deliver power from said turbine.

7. The turbine of claim 1, further comprising a brake component disposed on said exterior surface, said brake component configured to be cooperatively engaged with a braking mechanism to control turbine rotation speed.

8. A flowing water turbine assembly, comprising:
    a support structure;
    first and second bearings carried by said support structure;
    a shaft having a front and rear ends rotatably received in said first and second bearings, respectively;
    an annular blade shroud coaxially disposed around said shaft in a sealing relationship with the support structure, said shroud being rotatable with respect to the support structure and having an interior surface and an exterior surface;
    a plurality of blades coupled to said shaft, said plurality of blades extending radially from said center shaft so as to engage said annular blade shroud; and
    a brake mechanism including a first brake component mounted on said exterior surface of said blade shroud and a second brake component mounted to said support structure, said first and second brake components being mechanically engageable to control turbine rotation speed.

9. The turbine assembly of claim 8, wherein said plurality of blades are configured and dimensioned in combination with said shroud to provide a lift coefficient of about 1.5.

10. The turbine assembly of claim 8, wherein said plurality of blades are configured and dimensioned in combination with said shroud to provide a tip speed ratio of in the range of about 1.2 to about 4.

11. The turbine assembly of claim 8, further comprising a power take off mechanism including a drive component disposed on said exterior surface and a complementary driven component mounted on the support structure.

12. The turbine assembly of claim 11, wherein said drive component is disposed around an outer circumference of the annular blade shroud.

13. The turbine assembly of claim 8, wherein the first brake component comprises a member extending radially from said exterior surface and the second component comprises caliper mounted to the support structure for frictional engagement of the first component.

14. The turbine assembly of claim 8, wherein said support structure comprises an inlet nozzle having a plurality of struts, said struts carrying the first bearings centrally within said inlet nozzle.

15. The turbine assembly of claim 14, wherein said support structure further comprises an outlet diffuser having a plurality of struts, said struts carrying the second bearings centrally within said outlet diffuser.

16. The turbine assembly of claim 15, including a plurality of structural members configured and dimensioned to span the blade shroud and secure together said inlet nozzle and said outlet diffuser.

17. The turbine assembly of claim 8, wherein said bearings permit rotation about plural axes.

18. The turbine assembly of claim 8, further comprising a sealing ring mounted around the circumference of said annular blade shroud, said sealing ring interposed between said exterior surface and said support structure and substantially blocking water passage between said support structure and said annular blade shroud during rotation of said shroud.

19. A flowing water turbine assembly configured to power a rotational energy conversion apparatus located above a water surface, comprising:
  a support structure configured to extend from above the water surface to below the water surface;
  a turbine rotatably mounted on said structure for positioning entirely below the water surface while said turbine is operating, said turbine comprising:
    an annular blade shroud having an interior surface and an exterior surface;
    a shaft coaxial with said blade shroud; and
    a plurality of blades coupled to said shaft, said plurality of blades extending radially from said center shaft so as to engage said blade shroud at said interior surface;
  a drive assembly component disposed on said exterior surface of the blade shroud and operatively engageable with said rotational energy conversion apparatus; and
  a lifting mechanism operable to move said turbine between a position entirely below the water surface and a position at least partially above the water surface.

20. The turbine assembly of claim 19, wherein said plurality of blades have a chord length, a radial length and angle of attack such that said plurality of blades produce a solidity of greater than about 8 percent but less than about 20 percent.

21. The turbine assembly of claim 20, wherein said plurality of blades create a solidity of greater than about 10 percent and less than about 15 percent.

22. The turbine assembly of claim 20 having a tip speed ratio of greater than about 1.2 and less than about 6.

23. The turbine assembly of claim 22 having a tip speed ratio of greater than about 1.2 and less than about 4.

24. The turbine assembly of claim 23 having a tip speed ratio of greater than about 1.2 and less than about 2.

25. The turbine assembly of claim 19, wherein said drive assembly component comprises a sprocket that mates with a chain operatively engageable with the rotational energy conversion apparatus.

26. The turbine assembly of claim 19, wherein said support structure comprises an inlet nozzle mated to and having an interior surface substantially collinear with said annular blade shroud, said inlet nozzle supporting a first bearing assembly with a plurality of struts.

27. The turbine assembly of claim 26, wherein said support structure further comprises an outlet diffuser mated to and having an interior surface substantially collinear with said annular blade shroud, said outlet diffuser supporting a second bearing assembly with a plurality of struts.

28. The turbine assembly of claim 27, wherein said shaft has a first end and second end, said first end and said second end being supported respectively by said first bearing assembly and said second bearing assembly.

29. The turbine assembly of claim 27, said turbine assembly further including a plurality of structural connectors configured and dimensioned to secure said inlet nozzle to said outlet diffuser.

30. The turbine assembly of claim 29, further comprising first and second sealing rings mounted around the circumference of said annular blade shroud, one said sealing ring interposed within a gap between the blade shroud and the nozzle and the other said sealing ring interposed within a gap between the blade shroud and the outlet diffuser, said sealing rings configured and dimensioned to substantially block water passage through said gaps.

31. The turbine assembly of claim 19, further comprising a brake mechanism including a first brake component mounted on the exterior surface of the blade shroud and a second brake component mounted to the support structure, said brake components operatively engageable to control turbine rotation speed.

32. The turbine assembly of claim 19, wherein the rotational energy conversion apparatus is mounted on the support structure above the water surface.

* * * * *